(12) United States Patent
Kim et al.

(10) Patent No.: US 9,739,683 B2
(45) Date of Patent: Aug. 22, 2017

(54) DEVICE FOR INSPECTING CANISTER FOR VEHICLE

(71) Applicant: KOREA FUEL-TECH CORPORATION, Anseong-si, Gyeonggi-do (KR)

(72) Inventors: Hyun Ki Kim, Pyeongtaek-si (KR); Hyun Shik Kim, Anseong-si (KR); Ju Young Oh, Anseong-si (KR); Byeong Un Choi, Anseong-si (KR); Jung Sun Lee, Anseong-si (KR); Jong Soo Lim, Gimhae-si (KR)

(73) Assignee: KOREA FUEL-TECH CORPORATION, Anseong-si, Gyeonggi-do (KR)

( * ) Notice: Subject to any disclaimer, the term of this patent is extended or adjusted under 35 U.S.C. 154(b) by 0 days.

(21) Appl. No.: 15/021,940

(22) PCT Filed: Sep. 17, 2014

(86) PCT No.: PCT/KR2014/008638
§ 371 (c)(1),
(2) Date: Mar. 15, 2016

(87) PCT Pub. No.: WO2015/041454
PCT Pub. Date: Mar. 26, 2015

(65) Prior Publication Data
US 2016/0231195 A1  Aug. 11, 2016

(30) Foreign Application Priority Data

Sep. 17, 2013  (KR) .................. 10-2013-0111612

(51) Int. Cl.
*G08B 21/12*  (2006.01)
*G01M 3/32*  (2006.01)
(Continued)

(52) U.S. Cl.
CPC .......... *G01M 3/02* (2013.01); *F02M 25/0818* (2013.01); *F02M 25/0854* (2013.01);
(Continued)

(58) Field of Classification Search
CPC .......... G01M 3/00; G01M 3/007; G01M 3/04; G01M 3/3272; G01M 3/3281;
(Continued)

(56) References Cited

U.S. PATENT DOCUMENTS 3,973,429 A * 8/1976 Durgan ................ G01M 3/025
                                                    73/49.7
4,213,328 A * 7/1980 Roeschlaub ............ G01N 3/12
                                                    73/49.7
(Continued)

FOREIGN PATENT DOCUMENTS

JP          09-303217 A      11/1997
KR    10-1998-0702455 A       7/1998
(Continued)

OTHER PUBLICATIONS

International Search Report in International Application No. PCT/KR2014/008638, dated Jan. 16, 2015.

*Primary Examiner* — Fekadeselassie Girma
(74) *Attorney, Agent, or Firm* — Park, Kim & Suh, LLC

(57) ABSTRACT

The present invention relates to a device for inspecting a canister for a vehicle, the device including: an inspection unit fixing a canister and inspecting airtightness of the canister using pressure of air supplied from an external supply source; a control unit controlling the pressure of the air and showing inspection process and result by the canister; and an alarm unit providing least any one of a voice and light warning in cooperation with the control unit in an inspection process when a defect of canister is detected.

20 Claims, 14 Drawing Sheets

(51) Int. Cl.
*G01M 3/02* (2006.01)
*F02M 25/08* (2006.01)
*G08B 3/10* (2006.01)
*G08B 5/36* (2006.01)

(52) U.S. Cl.
CPC .......... *G01M 3/329* (2013.01); *G01M 3/3236* (2013.01); *G08B 3/10* (2013.01); *G08B 5/36* (2013.01); *G08B 21/12* (2013.01)

(58) Field of Classification Search
CPC G01M 3/329; G01N 3/12; A61M 2205/3331; B41J 2/16508; B64F 5/30; F04B 51/00
See application file for complete search history.

(56) References Cited

U.S. PATENT DOCUMENTS

| | | | | | |
|---|---|---|---|---|---|
| 4,364,261 | A * | 12/1982 | Askwith | ............... | G01M 3/26 73/40 |
| 4,594,882 | A * | 6/1986 | Wheeler | ............... | G01M 3/025 73/49.7 |
| 4,617,824 | A * | 10/1986 | Cybulski | ............... | G01M 3/025 73/49.7 |
| 4,852,390 | A * | 8/1989 | Fisch | ............... | G01M 3/24 73/40.5 A |
| 4,860,575 | A * | 8/1989 | Robinson | ............... | G01M 3/12 73/49.7 |
| 4,905,501 | A * | 3/1990 | Sawatani | ............... | G01M 3/3281 73/40 |
| 4,998,435 | A * | 3/1991 | Miller | ............... | E21B 47/1015 73/40.7 |
| 5,095,738 | A * | 3/1992 | Roeschlaub | ............... | G01M 3/26 73/49.7 |
| 5,633,459 | A * | 5/1997 | Rodriguez | ............... | G01M 13/005 73/114.78 |
| 5,637,788 | A * | 6/1997 | Remboski | ............... | F02M 25/0809 73/40.5 R |
| 5,705,737 | A * | 1/1998 | Liao | ............... | G01M 3/025 73/40 |
| 5,798,703 | A * | 8/1998 | Sakai | ............... | F16P 3/12 307/119 |
| 6,014,893 | A * | 1/2000 | Reed | ............... | G01M 3/04 73/49.7 |
| 6,328,414 | B1 * | 12/2001 | Yoshino | ............... | B41J 2/16508 347/36 |
| 6,435,009 | B1 * | 8/2002 | Tilley | ............... | A62B 27/00 73/40 |
| 6,698,453 | B1 * | 3/2004 | Hutchison | ............... | F16K 11/10 137/881 |
| 6,935,163 | B2 * | 8/2005 | Stewart | ............... | G01M 3/2815 73/49.7 |
| 7,398,590 | B1 * | 7/2008 | Mann | ............... | G11B 5/5582 29/603.03 |
| 8,226,747 | B2 * | 7/2012 | Hanamoto | ............... | B01D 53/02 502/400 |
| 8,955,370 | B1 * | 2/2015 | Thornberg | ............... | G01M 3/3263 73/49.3 |
| 8,997,553 | B2 * | 4/2015 | McGregor | ............... | G01M 3/207 73/40.7 |
| 2003/0035036 | A1 * | 2/2003 | Ogura | ............... | B41J 2/17509 347/86 |
| 2005/0246112 | A1 * | 11/2005 | Abhulimen | ............... | F17D 5/02 702/51 |
| 2006/0090546 | A1 * | 5/2006 | McCoy | ............... | G01M 3/226 73/40.7 |
| 2007/0000310 | A1 * | 1/2007 | Yamartino | ............... | G01M 3/226 73/40.7 |
| 2007/0012098 | A1 * | 1/2007 | Sabelstrom | ............... | F04B 49/065 73/168 |
| 2008/0072658 | A1 * | 3/2008 | Meckl | ............... | G01M 3/34 73/45.3 |
| 2008/0150467 | A1 * | 6/2008 | Hashimoto | ............... | B25J 9/1676 318/568.17 |
| 2009/0050301 | A1 * | 2/2009 | Ishida | ............... | G06F 1/203 165/104.33 |
| 2009/0132185 | A1 * | 5/2009 | Furuse | ............... | G01M 3/3263 702/51 |
| 2010/0154516 | A1 * | 6/2010 | Hattori | ............... | G01M 3/329 73/40.7 |
| 2011/0286787 | A1 * | 11/2011 | Shibata | ............... | H01R 13/5202 403/288 |
| 2013/0089809 | A1 * | 4/2013 | Farrington | ............... | H01M 8/0273 429/492 |
| 2013/0292319 | A1 * | 11/2013 | Fulkerson | ............... | A61M 1/1692 210/321.78 |
| 2014/0241941 | A1 * | 8/2014 | Kreitenberg | ............... | B64D 11/0007 422/24 |
| 2014/0251831 | A1 * | 9/2014 | Ley | ............... | G01M 3/042 205/780.5 |
| 2014/0257721 | A1 * | 9/2014 | Thompson | ............... | G01M 3/226 702/51 |
| 2016/0136314 | A1 * | 5/2016 | Kreitenberg | ............... | B64F 5/30 422/24 |
| 2016/0146552 | A1 * | 5/2016 | Tutunoglu | ............... | B21D 53/08 165/173 |
| 2016/0178472 | A1 * | 6/2016 | Watanabe | ............... | G01M 3/202 73/40.7 |

FOREIGN PATENT DOCUMENTS

KR 10-2012-0002097 A 1/2012
KR 10-2012-0071427 A 7/2012

* cited by examiner (a)

(b)

(a)

(b)

DEVICE FOR INSPECTING CANISTER FOR VEHICLE

CROSS-REFERENCE TO RELATED APPLICATIONS

This application is the National Stage filing under 35 U.S.C. 371 of International Application No. PCT/KR2014/008638, filed on Sep. 17, 2014, which claims the benefit of Korean Patent Application No. 10-2013-0111612, filed on Sep. 17, 2013, the contents of which are all hereby incorporated by reference herein in their entirety.

TECHNICAL FIELD

The present invention relates to a device for inspecting a canister for a vehicle. More particularly, the present invention relates to a device for inspecting a canister for a vehicle, whereby the device can improve work efficiency and increase productivity by automating a process of inspecting a canister, can quickly and accurately determine airtightness of a canister using air pressure, can improve reliability of a product by reducing a defective proportion by simultaneously inspecting the internal configuration of a canister using a metal sensor on a side of a cradle, requires a minimum area by circumferentially arranging a plurality of inspection jigs on a circular rotary table, and can improve inspection efficiency by collectively inspecting a plurality of canisters.

BACKGROUND ART

In general, an internal combustion engine generating power by burning fuel and air is connected with a fuel tank keeping fuel for operating the engine in a vehicle.

Although depending on the degree of volatility and the temperature of external air, the fuel in the fuel tank discharges exhaust gas as time passes, and when the exhaust gas is discharged to the atmosphere, noxious components in the exhaust gas not only contaminate the atmosphere but also result in a waste of fuel.

Accordingly, a device for absorbing, keeping, and resending the exhaust gas from the fuel tank to the engine has been used. Such a device is generally called a canister.

The canister prevents air pollution and a loss of fuel due to leakage of exhaust gas by absorbing and keeping exhaust gas from a fuel tank using internal active carbon when an engine is stopped and then resending the exhaust gas to the engine when the engine is started.

Accordingly, it is required to hermetically seal the canister in order to effectively collect exhaust gas and ensure airtightness of the canister when the canister is inspected.

In the related art, airtightness of a canister is visually and manually inspected using hoses (air hoses) connected to ports in the related art; however, it is difficult to accurately determine defects and the inspection process is slow, so efficiency was very low.

Accordingly, it is urgently required to develop a device capable of improving accuracy in inspection of a canister and there is a need for an inspection device that can collectively inspect a great number of canisters through an automated process.

DISCLOSURE

Technical Problem

The present invention has been proposed to solve the problems in the related art. According to an aspect of the present invention, there is provided a device for inspecting a canister for a vehicle, the device being able to improve work efficiency by automatically inspecting a canister and thereby increasing the efficiency of manufacturing a canister.

According to another aspect of the present invention, there is provided a device for inspecting a canister for a vehicle, the device being able to quickly and accurately determine airtightness of a canister by electronically measuring pressure.

According to a further aspect of the present invention, there is provided a device for inspecting a canister for a vehicle, the device being able to simultaneously inspect internal configurations (elastic members or nuts (bolts)) of a canister using a metal sensor on a side of a cradle.

According to still another aspect of the present invention, there is provided a device for inspecting a canister for a vehicle, the device making it easy to easily discriminate qualified products by using a marking unit on an inspection jig for marking quality authentication.

According to yet another aspect of the present invention, there is provided a device for inspecting a canister for a vehicle, the device making it possible to easily and individually discriminate unqualified products by using a clamp unit that firmly hold a canister on an inspection jig to prevent the canister from unexpectedly separating while checking defects.

According to still another aspect of the present invention, there is provided a device for inspecting a canister for a vehicle, the device being able to occupy a minimal area because a plurality of inspection jigs for inspecting a canister is circumferentially arranged on a circular rotary table thereby improving work efficiency by continuously inspecting canisters.

According to still another aspect of the present invention, there is provided a device for inspecting a canister for a vehicle, the device being able to prevent a safety accident during working because it has a motion sensor that senses a worker entering an inspection unit.

According to still another aspect of the present invention, there is provided a device for inspecting a canister for a vehicle, the device being able to inspect canisters having various shapes only by replacing inspection jigs because the inspection jigs can be individually separated.

According to still another aspect of the present invention, there is provided a device for inspecting a canister for a vehicle, the device being able to easily and quickly seat a canister to be inspected, because inspection jigs are on inclining mechanisms.

According to still another aspect of the present invention, provided is a device for inspecting a canister for a vehicle, the device being able to easily discriminate defects because it has an alarm unit that warns a worker of a defect using voice or light when a defect is found while the canister is inspected.

Technical Solution

In order to achieve the above object, according to one aspect of the present invention, there is provided a device for inspecting a canister for a vehicle, the device including: an inspection unit fixing a canister and inspecting airtightness of the canister using pressure of air supplied from an external supply source; a control unit controlling the pressure of the air and showing an inspection process and result of the canister; and an alarm unit producing at least any one of a voice and light warning in cooperation with the control unit in an inspection process when a defect of the canister is detected.

The inspection unit may include one or more inspection jigs for fixing the canister and inspecting airtightness of the canister using pressure of air, and the inspection jigs may be circumferentially arranged on a circular rotary plate.

The rotary plate may be connected to a motor of an actuating unit and rotated in one or opposite directions.

The inspection jig may include: a seating unit where the canister is seated; a spraying unit connected with any one of an air port, a purge port, and a tank port of the canister and injecting air supplied through a hub connected with the supply source into the canister; a closing unit connected with at least one or more other ports not connected with the spraying unit and preventing air from being discharged out of the canister; and an inspection plate where the units are disposed and fixed.

The inspection jig may further include an inclining mechanism disposed between the inspection plate and the rotary plate and adjusting inclination of the inspection plate.

The inclining mechanism may include: an inclining plate where the inspection plate is seated; and an inclining unit adjusting inclination of the inclining plate.

The seating unit may include: a seating groove where the canister is seated; and supports preventing the canister from separating to a side by supporting sides of the canister.

The seating unit may further include a metal sensor inspecting whether there is an internal metal component in the canister so that an inspection result is shown in a display unit.

The spraying unit may include: a spraying cylinder extending a spraying rod such that the spraying rod is connected to one of the ports, using pressure of air supplied through the hub; and a spraying packing reinforcing airtightness between an outer side of the spraying rod and an inner side of the port, and the spraying rod is a pipe having an end connected to the hub so that air is supplied to the canister through a channel.

The closing unit may include: a closing cylinder longitudinally extending a closing rod using pressure of air supplied through the hub; a closing plate combined with the closing rod and having holes keeping and closing the other ports; and closing packings disposed in the holes and reinforcing airtightness between the holes and the other ports.

The closing plate may include: a first closing panel having the holes and combined with the closing rod; and a second closing panel disposed between the first closing panel and the closing cylinder, having closing channels connected with the holes, and guiding the first closing panel, and the closing channels may be connected with the hub through air hoses and close the other ports using pressure of air corresponding to pneumatic pressure of the spraying unit.

The inspection jig may further include a clamp unit preventing separation of the canister by covering a side of the canister such that the canister is in contact with the seating unit, and keeping the canister fixed through the control unit when there is a defect.

The clamp unit may include: a clamp cylinder rotating and longitudinally extending and retracting a clamp rod by taking inside and discharging air; and a clamp bar connected with the clamp cylinder and fixing or releasing the canister.

The inspection jig may further include a marking unit marking quality authentication for the canister.

The marking unit may include: a marking cylinder longitudinally extending the marking rod using pressure of air supplied through the hub; and a stamp connected with the marking rod and marking a side of the canister.

The inspection unit may further include motion sensors stopping operation when sensing a worker entering the inspection unit while the inspection unit is operated.

The control unit may include: a setting unit for correcting and supplementing operation of the inspection unit and pressure or air; and a monitor displaying an operation and a process of the inspection unit.

The control unit may further include a printer giving codes so that inspection history of the canister and information about a product can be checked.

The printer may output a barcode or a QR (Quick Response) code on a sticker.

The inspection unit may further include an operation unit restricting operation control and selective operation of the inspection jig.

The device may further include an alarm unit producing least any one of a voice and light warning in cooperation with the control unit in an inspection process when a defect of the canister is detected.

Advantageous Effects

According to the present invention, it is possible to improve work efficiency and increase productivity by automating a process of inspecting a canister.

Further, it is possible to quickly and accurately determine airtightness of a canister using air pressure, to improve reliability of a product by reducing a defective proportion by simultaneously inspecting the internal configuration (elastic member and nuts (bolts) of a canister using a metal sensor on a side of cradle. Accordingly, it is possible to prevent delivery of defective products and improve reliability of products.

Further, since an inspection jig includes a marking unit that marks quality authentication of a canister, it is possible to discriminate qualified products and prevent unqualified products from being mixed.

Further, since the inspection jig includes a clamp unit supporting a canister and prevents unexpected separation when there is a defect, it is possible to individually discriminate unqualified products and prevent the unqualified products from being mixed with qualified products.

Further, since a plurality of inspection jigs is circumferentially arranged on a circular rotary plate, it is possible to minimize the area occupied by the device and collectively inspect a plurality of canisters, so productivity can be improved.

Further, since the device includes motion sensors that sense a worker entering an inspection unit, it is possible to prevent a safety accident while the worker works.

Further, since the inspection jigs can be individually detached, it is possible to inspect canisters having various structures only by replacing the inspection jigs, so it is possible to improve competitiveness of products by reducing investment costs.

Further, since the inspection jig is inclined by an inclining mechanism, it is possible to quickly and easily seat a canister, so productivity can be improved.

Further, since there is provided an alarm unit producing at least any one of voice and light warning to a worker when a defect is found while a canister is inspected, it is easy to discriminate unqualified products, so it is possible to prevent the unqualified products from being mixed with qualified products.

Figure 1:
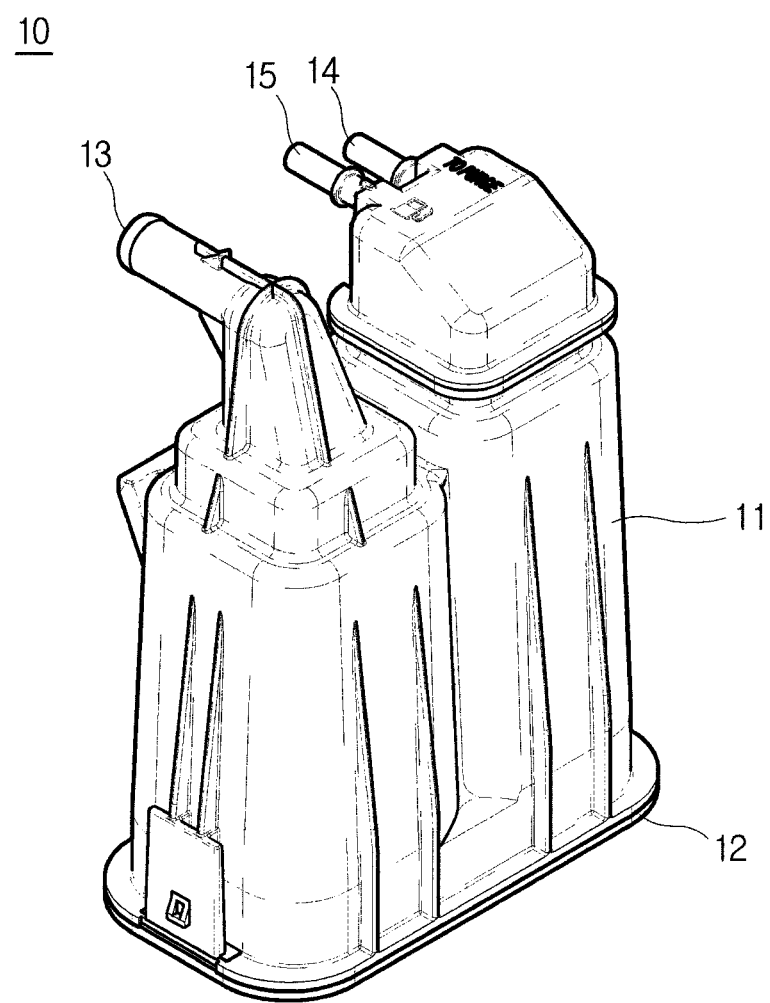
FIG. 1 is a perspective view of a canister for illustrating a device for inspecting a canister according to an embodiment of the present invention.

<Description of the Reference Numerals in the Drawings>

| | |
|---|---|
| 10: Canister | 11: Body |
| 12: Bottom plate | 13: Air port |
| 14: Purge port | 15: Tank port |
| 100: Inspection device | 110: Inspection unit |
| 111: Motion sensor | 113: Operation unit |
| 115: Hub | 117: Hose |
| 120: Inspection jig | 121: Inspection plate |
| 123: Inclining mechanism | 124: Inclining plate |
| 125: Inclining unit | 127: Rotary plate |
| 130: Seating unit | 131: Seating groove |
| 133: Support | 135: Metal sensor |
| 140: Spraying unit | 141: Spraying cylinder |
| 143: Spraying rod | 145: Spraying packing |
| 147: Spraying channel | 150: Closing unit |
| 151: Closing cylinder 152: Closing rod | |
| 153: Closing plate | 154: First closing panel |
| 155: Closing hole | 156: Second closing panel |
| 157: Closing guide | 158: Closing channel |
| 159: Closing packing | 160: Clamap unit |
| 161: Clamp cylinder | 163: Clamp rod |
| 165: Clamp bar | 170: Marking unit |
| 171: Marking cylinder | 173: Marking rod |
| 175: Stamp | 177: Marking stamp |
| 200: Control unit | 210: Setting unit |
| 230: Monitor | 240: Printer |
| 300: Actuating unit | 310: Motor |
| 400: Alaming unit | |

BEST MODE

Embodiments of a device for inspecting a canister for a vehicle according to the present invention will be described in detail hereafter with reference to the accompanying drawings. In describing the present invention, well-known functions or constructions will not be described in detail since they may unnecessarily obscure the understanding of the present invention.

Terminologies defined to describe the present invention are determined in consideration of functions in the present invention and may be changed intention of those skilled in the art or customs in the art, so the terminologies should be construed on the basis of the entire specification.

Figure 2:
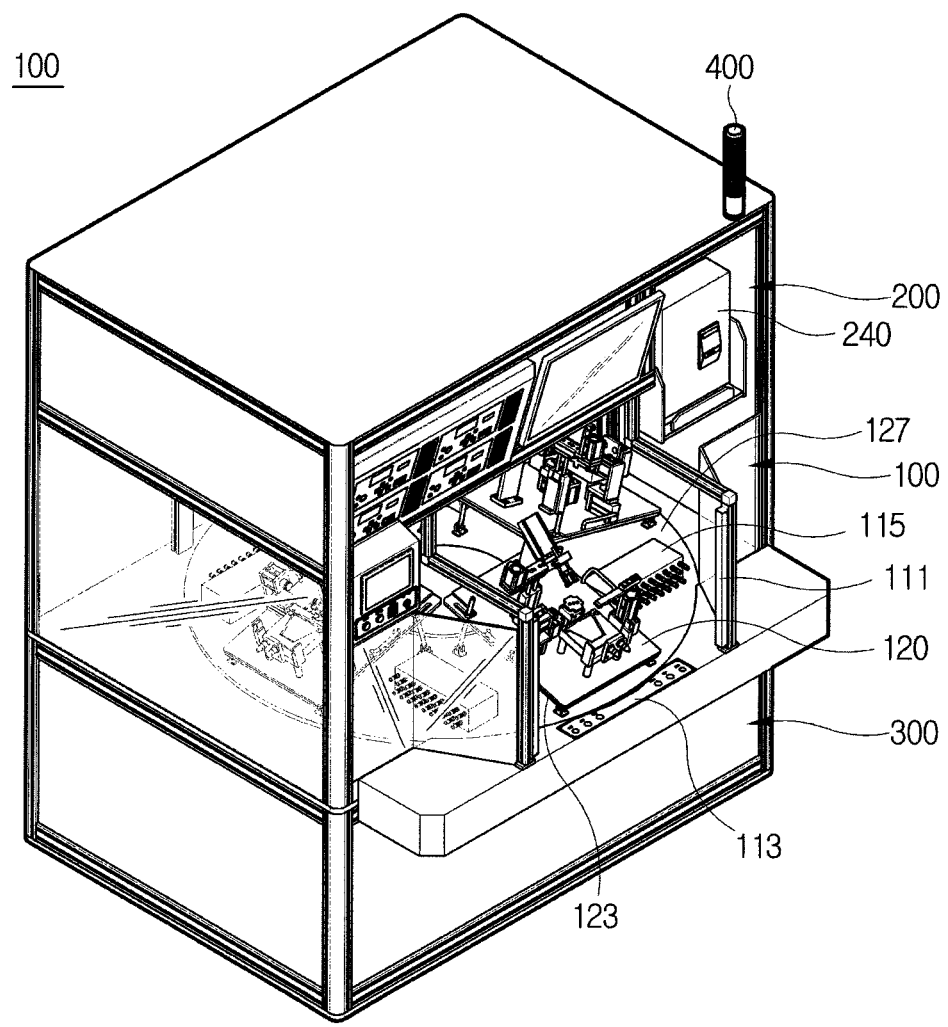
FIG. 2 is a perspective view for illustrating the device for inspecting a canister according to an embodiment of the present invention.
Figure 3:
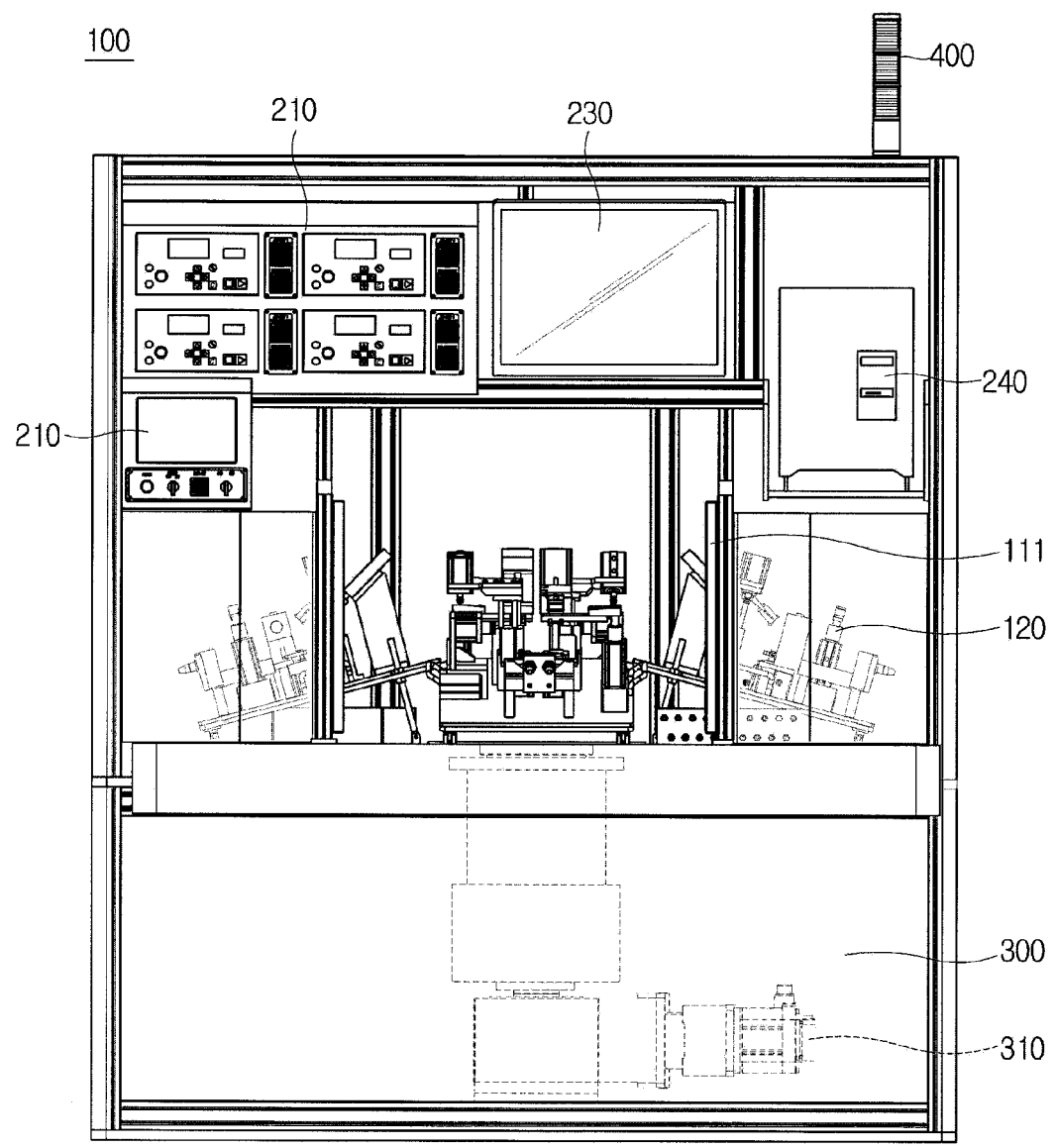
FIG. 3 is a front view for illustrating the device for inspecting a canister according to an embodiment of the present invention.

FIG. 1 is a perspective view of a canister for illustrating a device for inspecting a canister according to an embodiment of the present invention, FIG. 2 is a perspective view illustrating the device for inspecting a canister, and FIG. 3 is a front view illustrating the device.

As shown in the figures, a canister 10 includes a body 11 having an air port 13, a purge port 14, and a tank port 15 and a bottom plate 12 covering the bottom of the body 11, and the body 11, though not shown in the figures, includes active carbons, a filter, a strainer, and an elastic body, which is the structure of common canisters and not described and nor shown in detail in the figures.

It is required to keep the canister 10 hermetic to prevent leakage of exhaust gas collected in the canister 10 and airtightness can be checked by the inspection device shown in FIGS. 2 and 3.

An inspection device 100 includes an inspection unit 110 that fixes the canister 10 and checks airtightness of the canister 10 using the pressure of air supplied from an external supply source, a control unit 20 adjusting the pressure of air and showing the process and result of inspecting the canister 10, and an alarm unit 400 making a warning of a defect of the canister 10 using any one of voice and light in cooperation with the control unit 200 in the inspection process, in which the inspection unit 110 includes an actuating unit 300 rotating a rotary plate 127 in one or opposite directions.

Although the supply source for supplying air is not shown in the figures, it is a common air pump or any one selected from an air compressor and specific devices generating air pressure, and is disposed inside or outside the inspection device 100; however, the air compressor may be disposed with a motor 310 in the actuating unit 300.

The control unit 200 includes a setting unit 210 that corrects and supplements operation of the inspection unit 110 and the pressure of air and a monitor 230 that displays operation and process of the inspection unit 110.

The setting unit 210 is used to input setting values or manually control the inspection unit 110 in the automatic process of the inspection unit 110.

The monitor 230 shows the operation and process of the inspection unit 110 and shows the current state to a worker by displaying a defect or malfunction.

That is, when there is a defect or malfunction, the monitor 230 shows the current state to a worker and displays abnormal parts of the device so that the worker can easily handle the problem.

The control unit 200 further includes a printer 240 that gives codes so that inspection history of the canister 10 and information about a product can be checked.

The printer 240 may output a barcode or a QR (Quick Response) code on a sticker so that the codes can be easily attached to inspected canisters 10.

The inspection unit 110 includes at least one inspection jigs 120 fixing the canister 10 and inspecting airtightness of the canister 10 using the pressure of air, a motion sensor 111 stopping operation of the device by sensing a worker entering the inspection unit while working, and an operation unit 113 restricting operation control and selective operation of the inspection jigs 120.

The motion sensor 111 is disposed on the front of the inspection unit 110 to prevent a worker accident, damage to the device, and deterioration of precision in inspection by stopping operation of the device, when not only the body of a worker, but foreign substances interfering with the operation of the inspection unit 110 enter the inspection unit.

A pair of motion sensors 111 may be disposed opposite to each other on the front of the inspection unit 110, as shown in the figures.

The operation unit 113, which operates the operation of the inspection unit 110 separately from the control unit 200, has switches for operating, stopping, resetting, and repeating the inspection unit 110 to provide convenience for a worker and to easily deal with a sudden situation (for example, emergency stop or equipment inspection).

The inspection jigs 120 are circumferentially arranged on a circular rotary plate 128, so a plurality of canisters 10 can be simultaneously inspected and accordingly work can be continued. Further, since they are circumferentially arranged on the rotary plate 127, the area occupied by the device can be minimized, so a plurality of canisters 10 can be inspected.

The rotary plate 127 is connected to the motor 310 of the actuating unit 300 to be rotated in one or opposite directions. The rotary plate 127 is preferably rotated in opposite directions.

Figure 4:
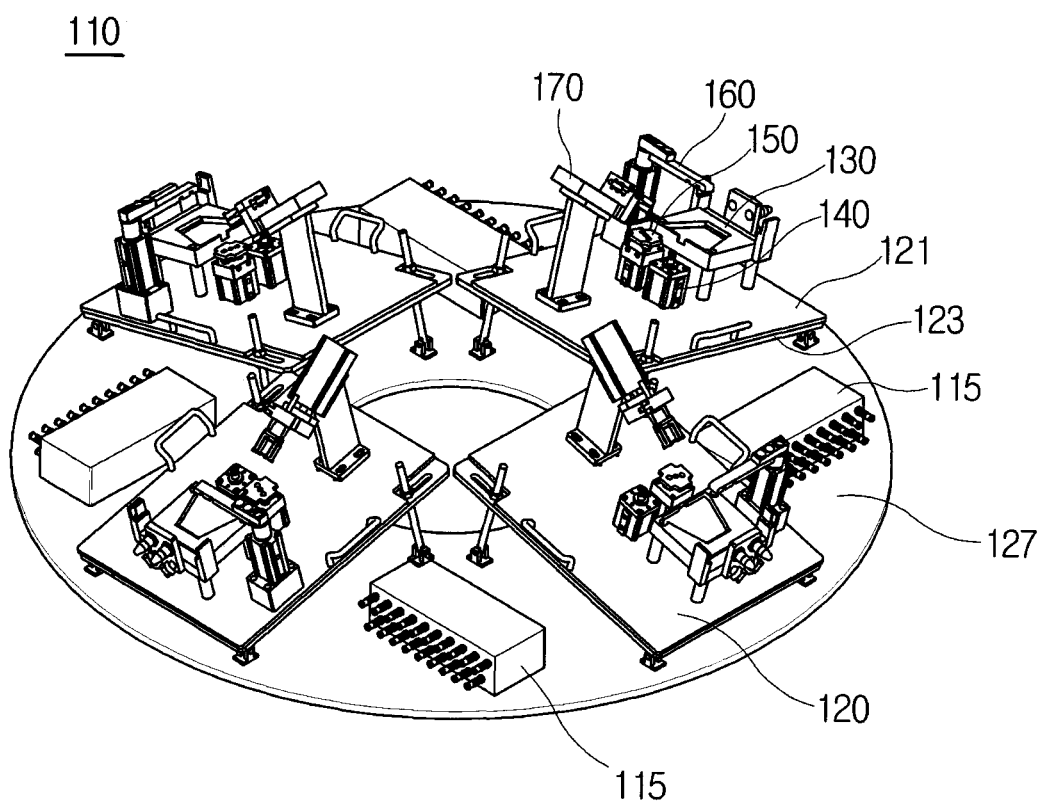
FIG. 4 is a perspective view for illustrating an inspection unit according to an embodiment of the present invention.

It is preferable that two or more inspection jigs are arranged on the rotary plate 127, and it is very preferable that, as shown in FIG. 4, four inspection jigs 120 are circumferentially arranged on the rotary plate 127.

However, the arrangement manner and the number of the inspection jigs 120 are not limited to those shown in the figure and can be freely changed in accordance with the place and the environment (for example, the output).

The inspection jigs 120 are described in detail with reference to FIG. 5 that is a perspective view of the inspection jigs 120 and FIGS. 6 to 12 showing the units in detail.

Figure 5:
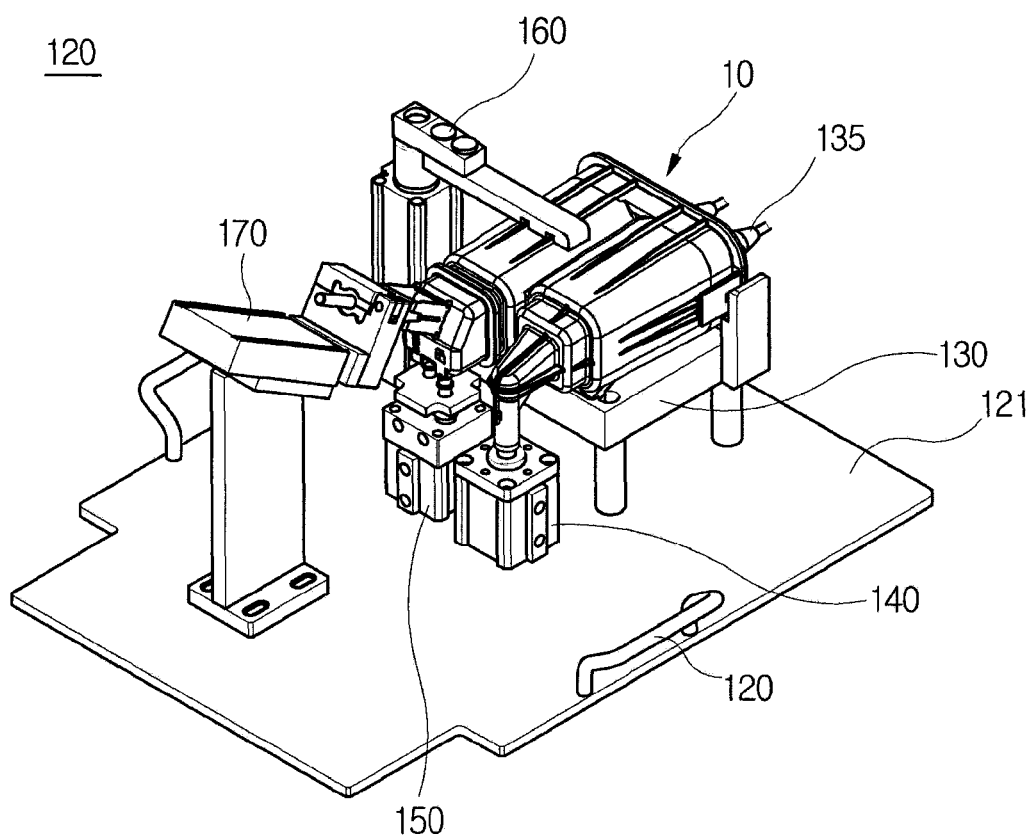
FIG. 5 is a perspective view for illustrating an inspection jig according to an embodiment of the present invention.

FIG. 5 is a perspective view for illustrating an inspection jig according to an embodiment of the present invention.

The inspection jigs 120, as show in FIG. 5, includes a seating unit 130 where the canister 10 is seated, a clamp unit 160 fixing the canister 10 on the seating unit 130, a spraying unit 140 connected with any one of the ports of the canister 10, a closing unit 150 connected with the other port not connected with the spraying unit 140, a marking unit 170 marking quality authentication on the canister 10, and an inspection plate 121 where the units are disposed.

The inspection jig 120 further includes an inclining mechanism 123 disposed between the inspection plate 121 and the rotary plate 127 and adjusts the inclination of the inspection plate 121, which will be described in detail below.

Figure 6:
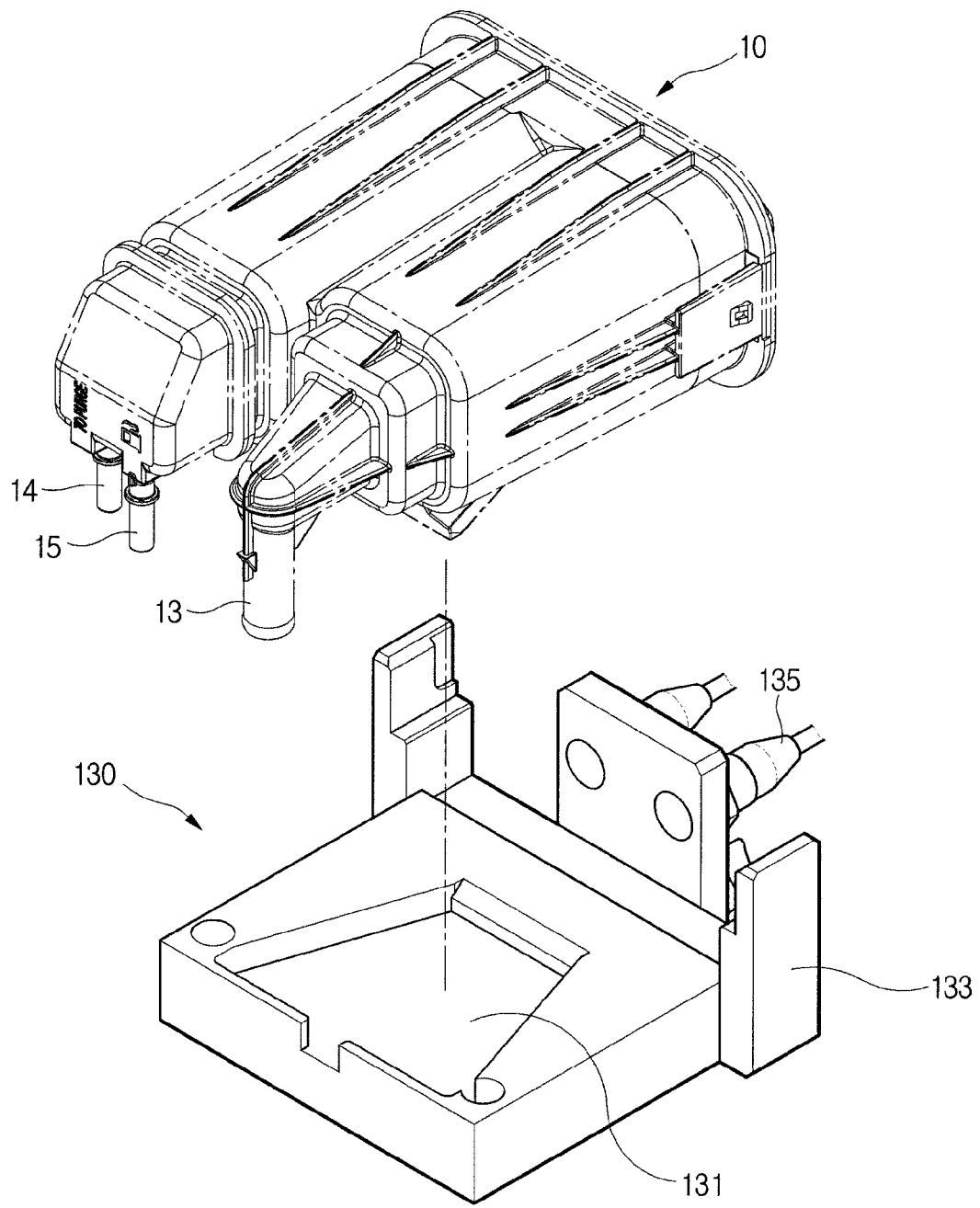
FIG. 6 is a perspective view for illustrating a cradle according to an embodiment of the present invention.

The seating unit 130, as show in FIG. 6, has a seat 131 where the canister 10 is placed and supports 133 that prevent the canister 10 from separating at least to a side by supporting sides of the canister 10.

The seat 131 may be formed in a groove shape corresponding to a side (bottom in the figure) of the canister 10 so that the canister 10 can be stably seated.

The seating unit 130 further includes a metal sensor 135 to inspect metallic internal components in the canister 10.

The metal sensor 135, though not shown in the figure, can check whether there are internal components (for example, an elastic member, a nut, and a bolt) in the canister.

That is, since it is possible to inspect airtightness of the canister 10 and at least metallic components in the interior parts in the manufacturing process, it is easy to discriminate unqualified products and prevent the unqualified products from being delivered, so reliability of products can be improved.

Figure 7:
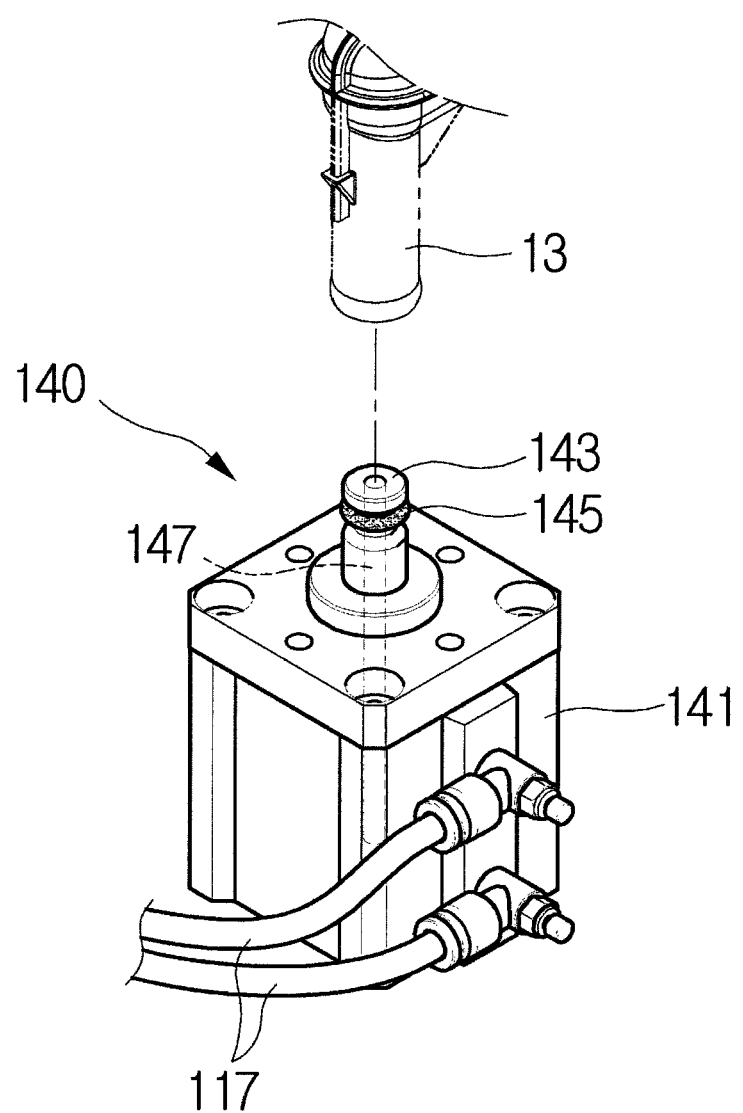
FIG. 7 is a perspective view for illustrating a spraying unit according to an embodiment of the present invention.

The spraying unit 140, as shown in FIG. 7, includes a spraying cylinder 143 longitudinally extending a spraying rod to a port using the pressure of air supplied through a hose 117 and a spraying packing 145 reinforcing airtightness between the outer side of the spraying rod 143 and the inner side of a port. The hose 117 is not shown in the figure but is connected to a hub 115 shown in FIG. 4.

The spraying cylinder 141 longitudinally extends or retracts the spraying rod 143 by taking inside or discharging air so that the spraying port is connected to or disconnected from a port, which can be achieved by a common air cylinder, so the detailed description is not provided.

Although the spraying rod 143 is not shown, it may be a pipe having an end connected to the hub 115 and having a channel 147 therein so that air is supplied to the canister 10 through it.

The port connected with the spraying unit 140 may be any one of the air port 13, the tank port 15, and the purge port 14, and preferably, it may be the air port 13, as shown in the figure.

Figure 8:
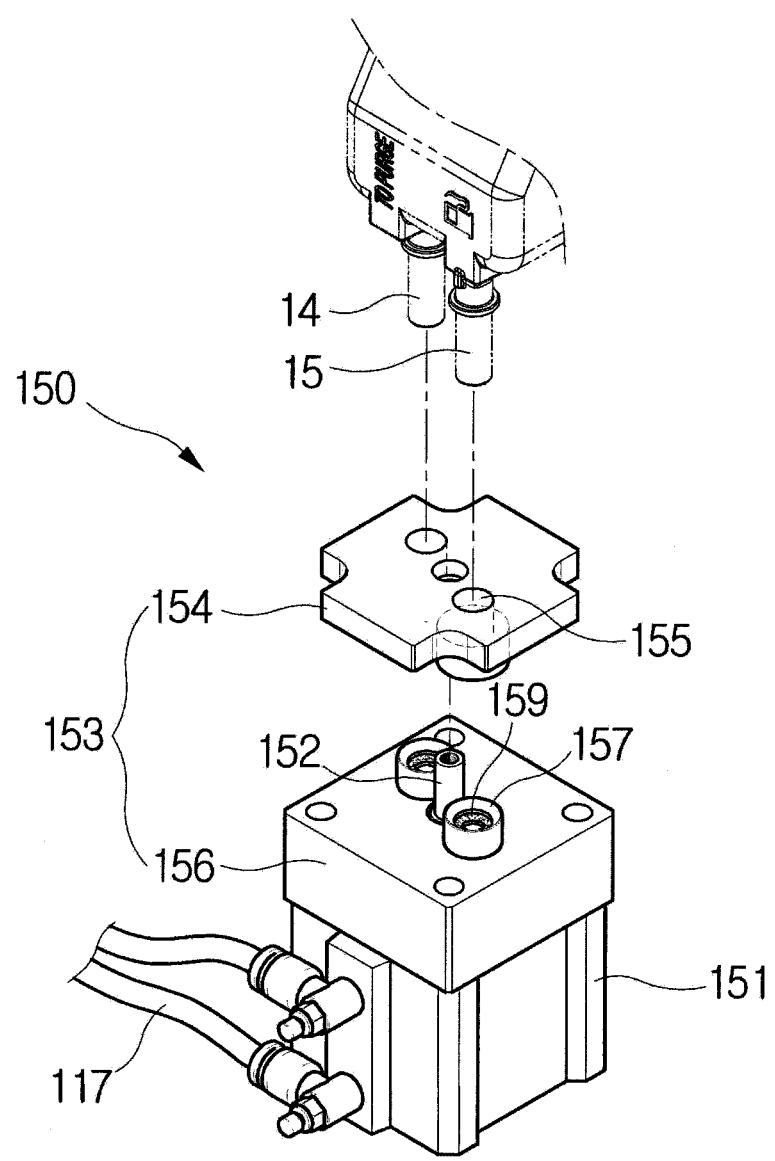
FIG. 8 is a partial exploded perspective view for illustrating a closing unit according to an embodiment of the present invention.

The closing unit 150, as shown in FIG. 8, includes a closing cylinder 151 longitudinally extending a closing rod 152 using the pressure of air supplied through the hub 115, a closing plate 153 combined with the closing rod 152 and having closing holes 155 for keeping and closing other ports, and a closing packing 159 disposed in the closing packing 159 and reinforcing airtightness between the closing hole 155 and other ports.

The closing cylinder 151, similar to the spraying cylinder 141, is a common air cylinder longitudinally extending and retracting a rod by taking inside or discharging air, so it is not described herein.

The closing plate 153 prevents the air in the canister 10 from leaking outside by closing the inlets of ports inserted in the closing holes 155.

The closing plate 153 includes a first closing panel 154 having the closing holes 155 and combined with the closing rod 152 to move up/down with extension and retraction of the closing rod and a second closing panel 156 disposed between the first closing panel 154 and the closing cylinder 151 and guiding the first closing panel 154.

Another port, that is, the other port not connected with the air port 13, is inserted in the first closing panel 154, in which the other port may be connected with the tank port 15 and the purge port 14, as shown in the figure, but is not limited thereto.

The second closing panel 156 includes pipe-shaped closing guides 157 guiding the first closing panel 154 moving up and down ring-shaped closing packings 159 reinforcing airtightness of the ports inserted in the closing holes 155.

The closing packing 159 may be made of an elastic material such as rubber, silicon, and urethane.

Figure 9:
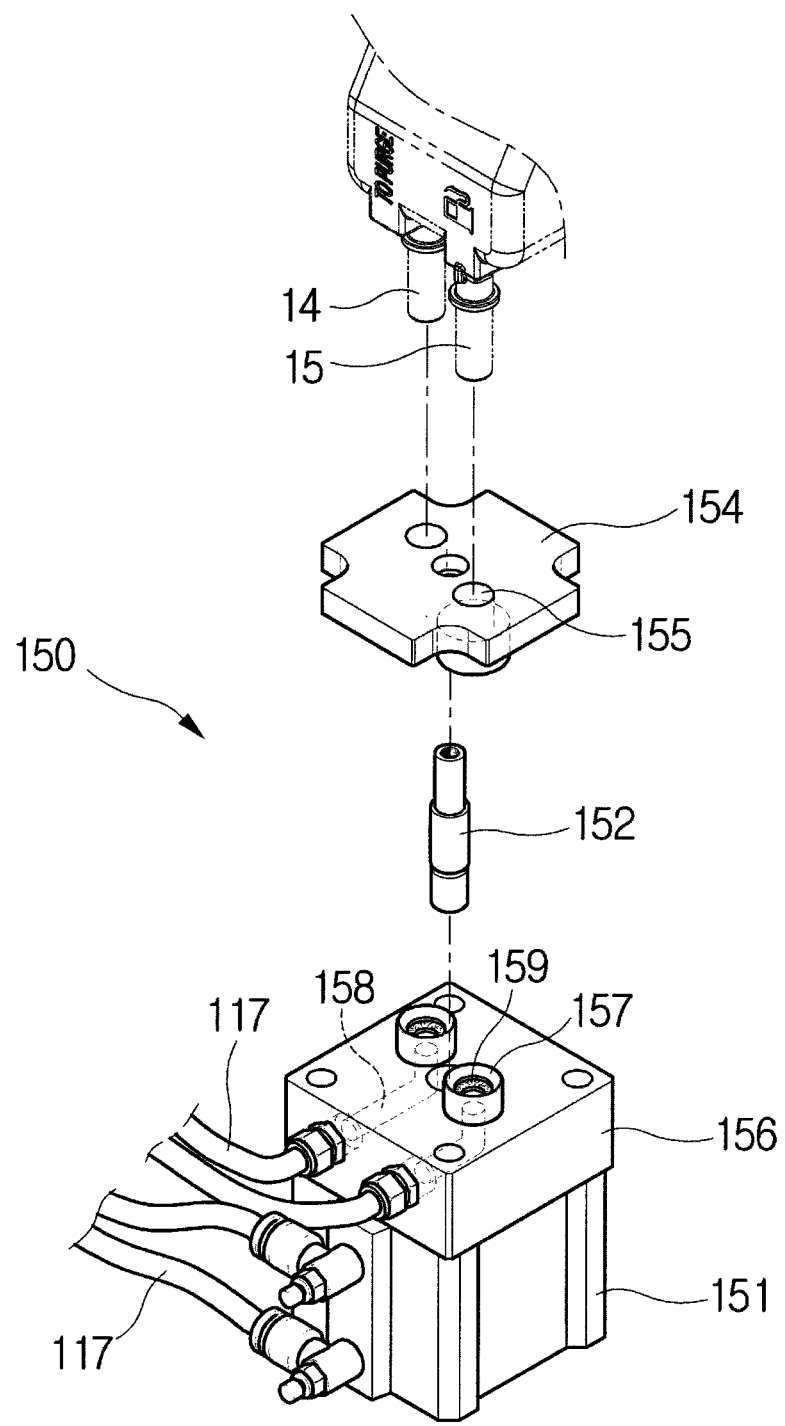
FIG. 9 is an exploded perspective view for illustrating an example of the closing unit according to an embodiment of the present invention.

The ports are inserted in the closing holes 155 with the inlets closed, or as shown in FIG. 9, closing channels 158 connected to the closing guides 157 so that air flows inside through the hoses 117 connected with the hub 115 may be further formed inside the second closing panel 156 to prevent air from leaking through other ports using the pressure of air corresponding to the pneumatic pressure of the spraying unit 140.

Figure 10:
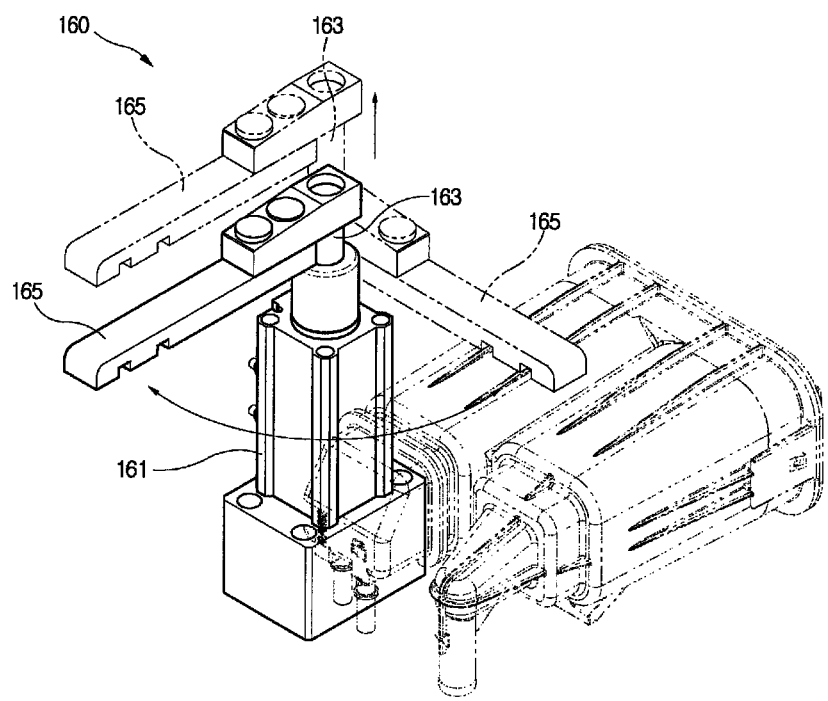
FIG. 10 is a perspective view for illustrating a clamp unit according to an embodiment of the present invention.

The clamp unit 160, as shown in FIG. 10, prevents separation of the canister 10 by covering a side of the canister 10 so that the canister 10 is fixed to the seating unit 130, and when there is a defect, the clamp unit 160 restricts unexpected separation by keeping the canister 10 fixed through the control unit 200.

The clamp unit 160 includes a clamp cylinder 161 that longitudinally extends and retracts the clamp rod 164 while rotating the clamp rod 163 by taking inside or discharging air and a clamp bar 165 that is connected with the clamp cylinder 161 and fixes or releases the canister 10.

The clamp cylinder 161 is operated in the same manner using pneumatic pressure as the spraying cylinder 141 and the closing cylinder 151, but the clamp rod 163 moves up and down and simultaneously rotates, which can be achieved by one of common air cylinders, so it is not described herein.

Figure 11:
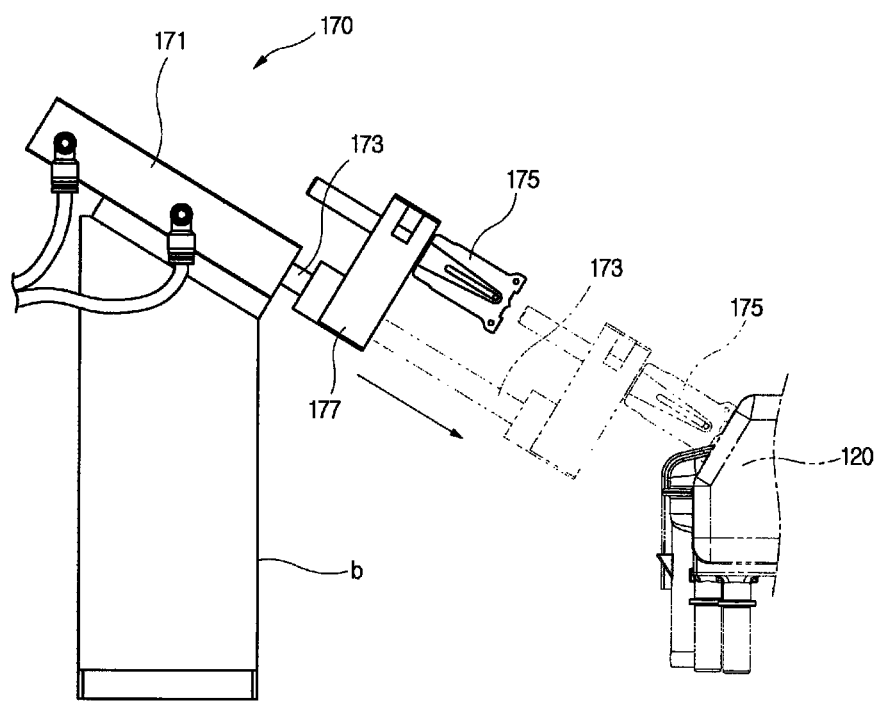
FIG. 11 is a side view for illustrating a marking unit according to an embodiment of the present invention.

The marking unit 170, which marks quality authentication for the canister 10, as shown in FIG. 11, is provided to discriminate qualified products and prevent unqualified products from being mixed.

The marking unit 170 includes a marking cylinder 171 longitudinally extending a marking rod 173 using the pressure of air supplied through the hub 115 and a stamp 175 connected with the marking rod 173 and marking a side of the canister 10, in which the stamp 175 may be combined through a marking clamp 177 connected with the marking rod 173 to be detachable and replaceable.

The marking cylinder 171 may be installed through a bracket (b) so that the height and angle can be easily adjusted, in which the bracket (b) has predetermined height and inclination, as shown in the figure.

However, the height and angle of the bracket (b) are not limited thereto and may be selectively adjusted in accordance with a marking position.

The stamp 175 may be used to mark not only qualified products, but also unqualified products.

Figure 12:
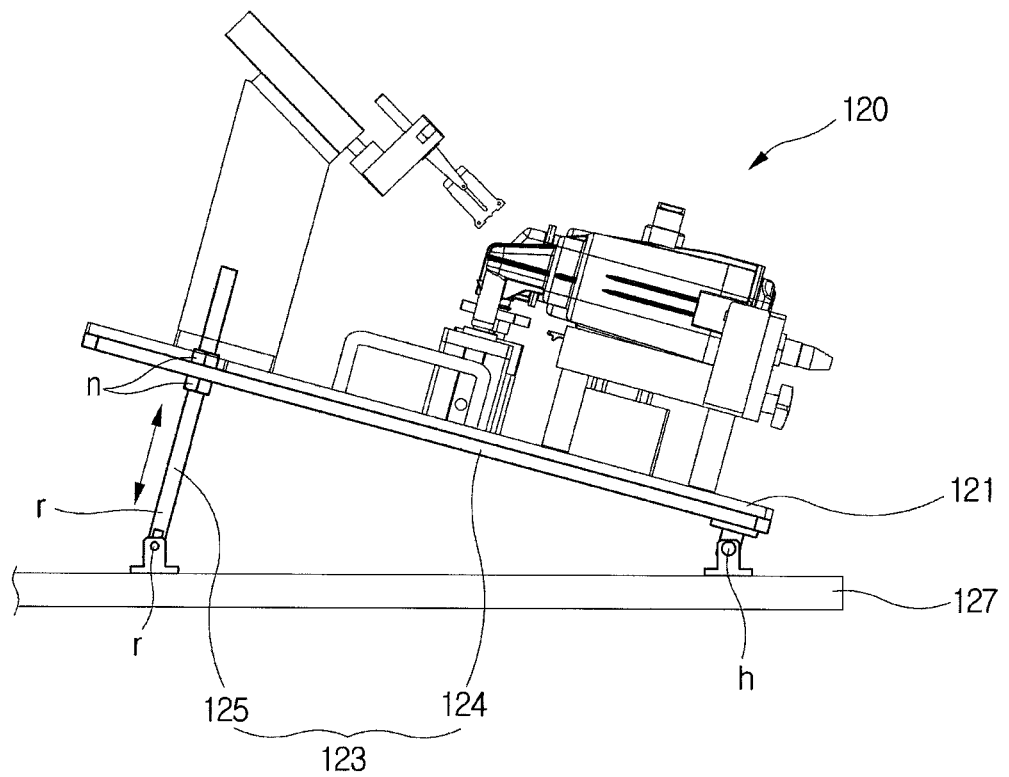
FIG. 12 is a side view for illustrating an inclining mechanism according to an embodiment of the present invention.
Figure 13:
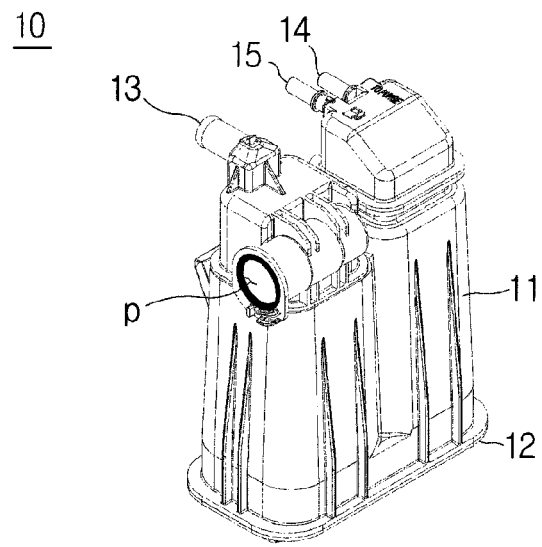
FIG. 13 illustrates an example of the inspection jig according to an embodiment of the present invention in perspective views.
Figure 13:
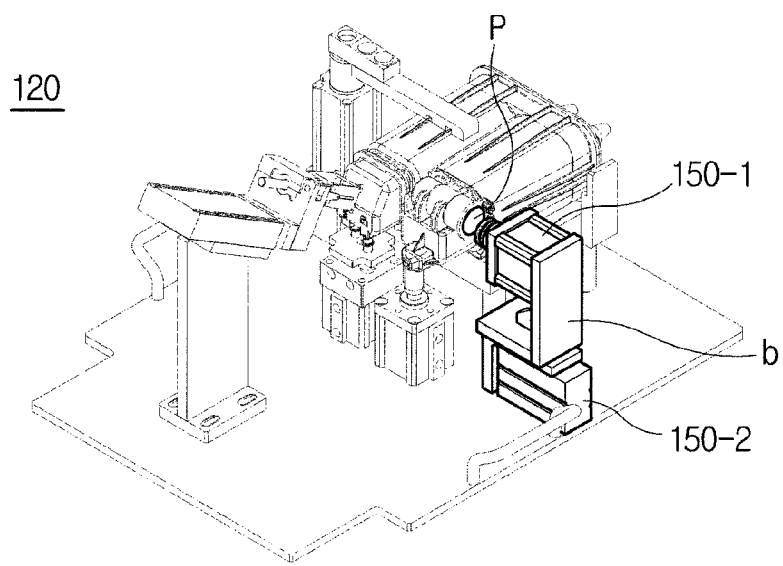
Figure 14:
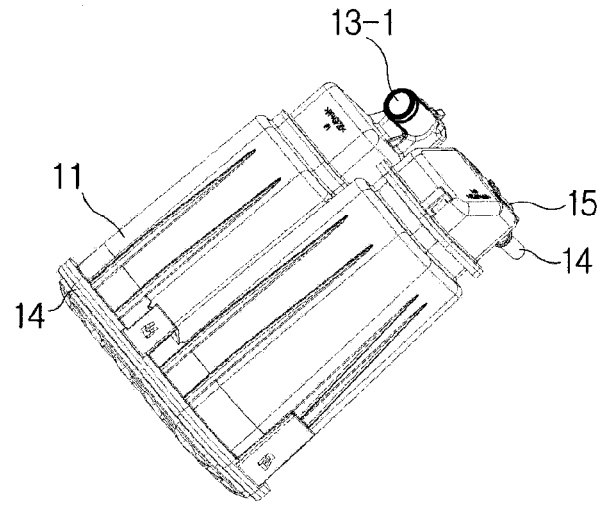
FIG. 14 illustrates another example of the inspection jig according to an embodiment of the present invention in perspective views.
Figure 14:
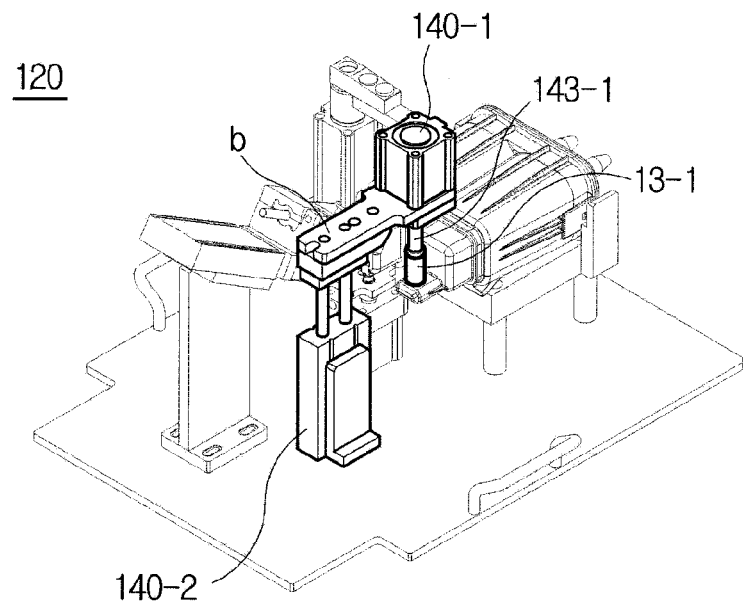

The inclining mechanism 123, which is disposed between the inspection plate 121 and the rotary plate 127 to adjust the inclination of the inspection plate 121, as shown in FIG. 12, inclines the inspection jig 120 at a predetermined angle so that the canister 10 can be quickly loaded and unloaded and the inspection jig 120 can be replaced with another type of jig 120, as shown in FIGS. 13 and 14.

The inclining mechanism 123 includes an inclining plate 124 where the inspection plate 121 is placed and an inclining unit 125 adjusting the inclination of the inclining plate 124.

The inclining plate 124 may be a panel having an area corresponding to the inspection plate 121, and though not shown in the figure, the inclining plate 124 and the inspection plate 121 are coupled by pins so that the inspection plate 121 can be easily coupled to and decoupled from the inclining plate 124 and can be stably held.

The inclining unit 125, as shown in the figure, includes: an inclining rod (r) adjusting the inclination of both a hinge (h) and the inclining plate 124; and a pair of fixing bolts (n), which is a common configuration for adjusting an angle, so it is not described herein.

The inspection jig 120 can be easily detached from the inclining assembly 123, so the jig can be replaced with other jigs in accordance with canisters 10 having various shapes, so the canisters 10 shown in FIGS. 13 and 14 and other various canisters 10 can be inspected, and accordingly, it is possible to improve competitiveness of products by reducing investment costs, which will be described in detail with reference to the figures.

FIG. 13 illustrates an example of an inspection jig according to an embodiment of the present invention in perspective views and FIG. 14 illustrates another example of an inspection jig in perspective views.

FIG. 13 illustrates an example of the inspection jig 120 for inspecting any one of various canisters 10. FIG. 13a shows a canister further including a port (p) in the canister 10 shown in FIG. 1, in which the additional port (p) for installing a valve for the air port 13 and is provided, depending on the types of canisters 10 (for example, selective specifications of a vehicle).

As shown in FIG. 13b, another closing unit 150-1 is further provided to further close the additional port (p), when the canister 10 is inspected, as shown in FIG. 13b, in which the closing unit 150-1 is achieved by combining the closing cylinder 150 and the closing rod 151, as described with reference to FIG. 9.

The closing unit 150-1 may further include a bracket (b) or an air cylinder 150-2 in accordance with the length and height, as shown in the figure.

FIG. 14 illustrates another example of an inspection jig for inspecting another type of canister.

FIG. 14a shows a canister 10 in which an air port 13 is formed in a different direction from the configuration of the canister 10 shown in FIG. 1. That is, a tank port 15 and a purge port 14 are formed downward, but an air port 13 is formed upward in the canister 10.

The canister 10 has another type of spraying unit 140 different from that in FIG. 7, that is, as shown in FIG. 14b, a spraying rod 143-1 is moved up and connected to the air port 13 in the spraying unit, in which the spraying unit 140-1 may further has an air cylinder 140-2 and a bracket (b) in accordance with the position and height of the air port 13.

Though not shown in the figures, a canister 10 of the present invention is not limited to those shown in FIGS. 1, 13, and 14, and it is possible to inspect various canisters by adding units or changing the positions of units.

As described above, since the inspection jigs can be individually detached and replaced, it is possible to inspect canisters having various structures only by replacing the inspection jigs, so it is possible to not only inspect a plurality of canisters with one device, but inspect various canisters only by replacing some parts.

The present invention was described in detail with reference to examples, but the present invention is not limited thereto and may be modified in various ways without departing from the scope of the present invention. Accordingly, the embodiments described herein are provided not to limit the scope of the present invention, but to describe the present invention, and so the scope of the present invention is not limited by the embodiments. The protective range of the present disclosure should be construed on the basis of claims and all the technical spirits in the equivalent range should be construed as being included in the scope of the right of the present disclosure.

The invention claimed is:

1. A device for inspecting a canister for a vehicle, the device comprising:
    an inspection unit fixing a canister and inspecting airtightness of the canister using pressure of air supplied from an external supply source; and
    a control unit controlling the pressure of the air and showing inspection process and result of the canister,
    wherein the inspection unit includes one or more inspection jigs for fixing the canister and inspecting airtightness of the canister using pressure of air, and the inspection jigs are circumferentially arranged on a circular rotary plate, wherein each inspection jig includes:
- a seating unit where the canister is seated;
- a spraying unit connected with any one of an air port, a purge port, and a tank port of the canister and injecting air supplied through a hub connected with the supply source into the canister;
- a closing unit connected with at least one or more other ports not connected with the spraying unit and preventing air from being discharged out of the canister; and
- an inspection plate where the units are disposed and fixed.

2. The device of claim 1, wherein the rotary plate is connected to a motor of an actuating unit and rotated in one or opposite directions.

3. The device of claim 1, wherein each inspection jig further includes an inclining mechanism disposed between the inspection plate and the rotary plate and adjusting inclination of the inspection plate.

4. The device of claim 3, wherein the inclining mechanism includes:
- an inclining plate where the inspection plate is seated; and
- an inclining unit adjusting inclination of the inclining plate.

5. The device of claim 1, wherein the seating unit includes:
- a seating groove where the canister is seated; and
- supports preventing the canister from separating to a side by supporting sides of the canister.

6. The device of claim 5, wherein the seating unit further includes a metal sensor inspecting whether there is an internal metal component in the canister so that inspection result is shown in a display unit.

7. The device of claim 1, wherein the spraying unit includes:
- a spraying cylinder longitudinally extending a spraying rod such that the spraying rod is connected to one of the ports, using pressure of air supplied through the hub; and
- a spraying packing reinforcing airtightness between an outer side of the spraying rod and an inner side of the port, and
- the spraying rod is a pipe having an end connected to the hub so that air is supplied to the canister through a channel.

8. The device of claim 1, wherein the closing unit includes:
- a closing cylinder longitudinally extending a closing rod using pressure of air supplied through the hub;
- a closing plate combined with the closing rod and having holes keeping and closing the other ports; and
- closing packings disposed in the holes and reinforcing airtightness between the holes and the other ports.

9. The device of claim 8, wherein the closing plate includes:
- a first closing panel having the holes and combined with the closing rod; and
- a second closing panel disposed between the first closing panel and the closing cylinder, having closing channels connected with the holes, and guiding the first closing panel, and the closing channels are connected with the hub through air hoses and close the other ports using pressure of air corresponding to pneumatic pressure of the spraying unit.

10. The device of claim 1, wherein each inspection jig further includes a clamp unit preventing separation of the canister by covering a side of the canister such that the canister is in contact with the seating unit, and keeping the canister fixed through the control unit when there is a defect.

11. The device of claim 10, wherein the clamp unit includes:
- a clamp cylinder rotating and longitudinally extending and retracting a clamp rod by taking inside and discharging air; and
- a clamp bar connected with the clamp cylinder and fixing or releasing the canister.

12. The device of claim 1, wherein each inspection jig further includes a marking unit marking quality authentication for the canister.

13. The device of claim 12, wherein the marking unit includes:
- a marking cylinder longitudinally extending the marking rod using pressure of air supplied through the hub; and
- a stamp connected with the marking rod and marking a side of the canister.

14. The device of claim 1, wherein the inspection unit further includes motion sensors stopping operation when sensing a worker entering the inspection unit while the inspection unit is operated.

15. The device of claim 1, wherein the control unit includes:
- a setting unit for correcting and supplementing operation of the inspection unit and pressure or air; and
- a monitor displaying an operation and a process of the inspection unit.

16. The device of claim 1, wherein the control unit includes a printer giving codes so that inspection history of the canister and information about a product can be checked.

17. The device of claim 16, wherein the printer outputs a barcode or a QR (Quick Response) code on a sticker.

18. The device of claim 1, wherein the inspection unit further includes an operation unit restricting operation control and selective operation of the inspection jigs.

19. The device of claim 1, further comprising an alarm unit producing at least any one of a voice and light warning in cooperation with the control unit in an inspection process when a defect of the canister is detected.

20. A device for inspecting a canister for a vehicle, the device comprising:
- an inspection unit fixing a canister and inspecting airtightness of the canister using pressure of air supplied from an external supply source; and
- a control unit controlling the pressure of the air and showing inspection process and result of the canister,
- wherein the control unit includes a printer giving codes so that inspection history of the canister and information about a product can be checked,
- wherein the printer outputs a barcode or a Quick Response (QR) code on a sticker.

* * * * *